(12) United States Patent
Morimoto et al.

(10) Patent No.: US 11,386,561 B2
(45) Date of Patent: Jul. 12, 2022

(54) X-RAY IMAGING APPARATUS AND X-RAY IMAGING METHOD

(71) Applicant: Shimadzu Corporation, Kyoto (JP)

(72) Inventors: Naoki Morimoto, Kyoto (JP); Kenji Kimura, Kyoto (JP); Taro Shirai, Kyoto (JP); Takahiro Doki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 308 days.

(21) Appl. No.: 16/885,524

(22) Filed: May 28, 2020

(65) Prior Publication Data

US 2021/0027472 A1 Jan. 28, 2021

(30) Foreign Application Priority Data

Jul. 25, 2019 (JP) .............................. JP2019-137185

(51) Int. Cl.
*G06T 7/13* (2017.01)
*G06T 11/00* (2006.01)
*G01F 22/00* (2006.01)

(52) U.S. Cl.
CPC ................ *G06T 7/13* (2017.01); *G01F 22/00* (2013.01); *G06T 11/008* (2013.01); *G06T 2200/04* (2013.01); *G06T 2207/10116* (2013.01)

(58) Field of Classification Search
CPC ..... G06T 7/13; G06T 11/008; G06T 2200/04; G06T 2207/10116; G01F 22/00
See application file for complete search history.

(56) References Cited

U.S. PATENT DOCUMENTS

| 8,265,224 | B2 * | 9/2012 | Baumgart | A61B 6/504 378/114 |
| 9,107,638 | B2 * | 8/2015 | Hoshino | G16H 50/30 |
| 9,619,868 | B2 * | 4/2017 | Ohba | G06T 5/00 |
| 2008/0069294 | A1 * | 3/2008 | Wigstrom | A61B 6/032 378/4 |
| 2015/0216499 | A1 | 8/2015 | Martens et al. | |
| 2015/0362444 | A1 * | 12/2015 | Nagai | G06T 7/12 378/36 |
| 2017/0065241 | A1 * | 3/2017 | Hoernig | A61B 6/5235 |

FOREIGN PATENT DOCUMENTS

WO 2014030115 A1 2/2014

* cited by examiner

*Primary Examiner* — Shefali D Goradia
(74) *Attorney, Agent, or Firm* — Muir Patent Law, PLLC

(57) ABSTRACT

An X-ray imaging apparatus is configured to acquire a plurality of pieces of slice image data from volume data, acquire a plurality of pieces of first processed image data by performing first processing, acquire a plurality of pieces of second processed image data by performing second processing, detect edges of the subject based on the acquired plurality of pieces of the second processed image data, and acquire edge image data including detected edges of the subject.

10 Claims, 7 Drawing Sheets

Absorption image

Dark-field image

Grating direction

X-RAY IMAGING APPARATUS AND X-RAY IMAGING METHOD

CROSS-REFERENCE TO RELATED APPLICATIONS

The related application number JP2019-137185, entitled "X-ray imaging apparatus and X-ray imaging method", filed on Jul. 25, 2019, and invented by Naoki Morimoto, Kenji Kimura, Taro Shirai, and Takahiro Doki upon which this patent application is based is hereby incorporated by reference.

BACKGROUND OF THE INVENTION

Field of the Invention

The present invention relates to an X-ray imaging apparatus and an X-ray imaging method.

Description of the Background Art

Conventionally, an X-ray imaging apparatus equipped with an X-ray source and a detector is known. Such a device is disclosed, for example, in International Publication No. WO 2014/030115.

In the above-described International Publication No. WO 2014/030115, an X-ray imaging system (X-ray imaging apparatus) for differential phase-contrast imaging equipped with an X-ray source and an X-ray detector is disclosed.

Although not specifically disclosed in the above-described International Publication No. WO 2014/030115, in a conventional X-ray imaging system as described in the above-described Patent Document 1, in some cases, three-dimensional volume data is acquired by reconstruction processing. In this case, there is a case in which an edge of a subject is detected from the three-dimensional volume data. However, in the case of performing standard edge detection processing, such as, e.g., a Canny method, as the detection processing of the edge of the subject, there is a problem that the edge analysis of the subject cannot be performed accurately since false edges due to the three-dimensional structure of the subject are generated.

SUMMARY OF THE INVENTION

The present invention has been made to solve the above-mentioned problems, and an object of the present invention is to provide an X-ray imaging apparatus and an X-ray imaging method capable of accurately performing an edge analysis of a subject in a case of detecting an edge of the subject from three-dimensional volume data.

In order to achieve the aforementioned object, an X-ray imaging apparatus according to the first aspect of the present invention includes:

an X-ray source;

a detector configured to detect X-rays emitted from the X-ray source and passed through a subject; and an image processing unit configured to acquire three-dimensional volume data by reconstruction processing based on X-ray detection data from the detector, wherein the image processing unit is configured to acquire a plurality of pieces of slice image data from the volume data, acquire a plurality of pieces of first processed image data respectively corresponding to the plurality pieces of the slice image data by subjecting the acquired plurality of pieces of the slice image data to differential processing as first processing, acquire a plurality of pieces of second processed image data by subjecting the acquired plurality of pieces of the first processed image data to second processing including addition processing, detect an edge of the subject based on the acquired plurality of pieces of the second processed image data, and acquire edge image data including the detected edge of the subject.

An X-ray imaging method according to the second aspect of the present invention includes:

a step of detecting X-rays that have passed through a subject;

a step of acquiring three-dimensional volume data by reconstruction processing based on detection data of the X-ray;

a step of acquiring a plurality of pieces of slice image data from the volume data;

a step of acquiring a plurality of pieces of first processed image data respectively corresponding to the plurality of pieces of the slice image data by respectively subjecting the plurality of pieces of the slice image data to differential processing as first processing;

a step of acquiring a plurality of pieces of the second processed image data by subjecting the plurality of pieces of the first processed image data to second processing including addition processing; and a step of acquiring edge image data including a detected edge of the subject by detecting an edge of the subject based on the plurality of pieces of the second processed image data.

According to the present invention, as described above, a plurality of pieces of slice image data is acquired from three-dimensional volume data, and a plurality of pieces of first processed image data respectively corresponding to the plurality of pieces of the slice image data is acquired by subjecting the acquired plurality of pieces of the slice image data to differential processing as first processing. With this, first processed image data including a signal representing a true edge and a signal representing a false edge can be acquired.

Then, a plurality of pieces of second processed image data is acquired by subjecting the plurality of pieces of the first processed image data to second processing including addition processing. With this, the second processed image data in which the signal representing a true edge remains uncanceled and the signal representing a false edge has been canceled can be acquired.

Then, the edge of the subject is detected based on the plurality of pieces of the second processed image data and the edge image data including the detected edge of the subject is acquired. With this, the edge of the subject can be detected with high accuracy, and the edge image data including the accurately detected edge of the subject can be acquired. As a result, in a case of detecting an edge of a subject from three-dimensional volume data, the edge analysis of the subject can be performed accurately based on the edge image data including the accurately detected edge of the subject.

DESCRIPTION OF THE PREFERRED EMBODIMENT

Hereinafter, an embodiment in which the present invention is embodied will be described with reference to the attached drawings.

First, referring to FIG. 1, an entire configuration of an X-ray imaging apparatus 100 according to an embodiment will be described.

(Configuration of X-Ray Imaging Apparatus)

Figure 1:
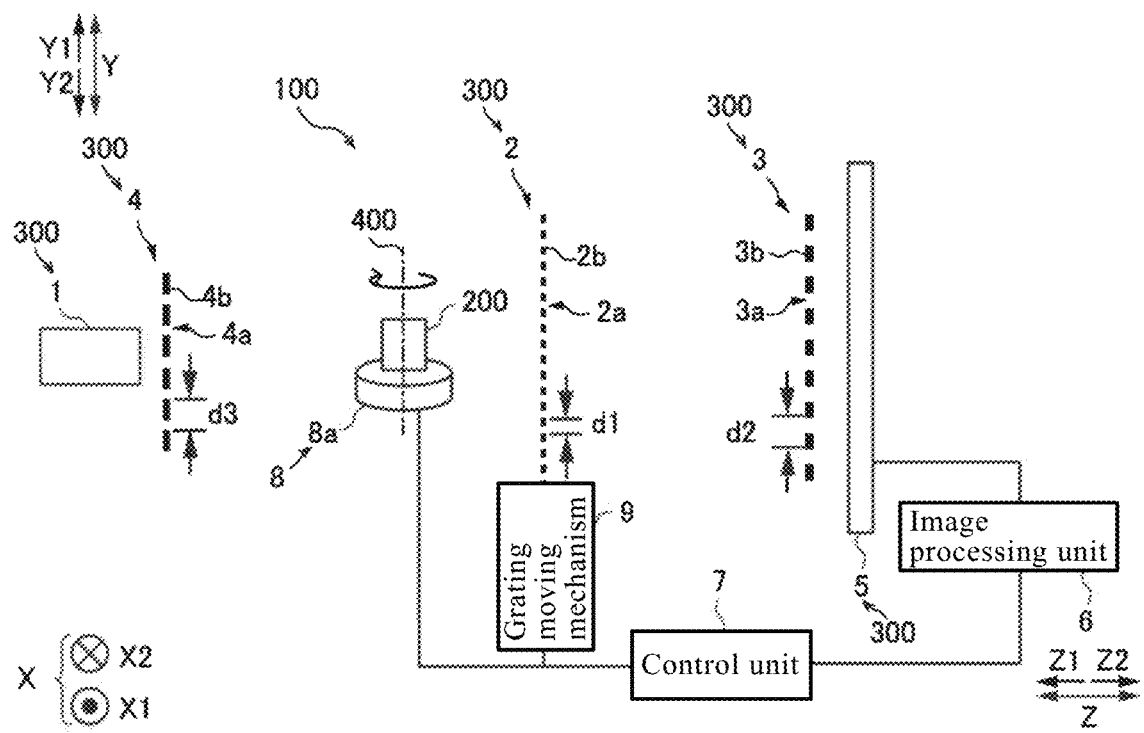
FIG. 1 is a diagram showing a configuration of an X-ray imaging apparatus according to an embodiment.

As shown in FIG. 1, an X-ray imaging apparatus 100 is an apparatus that generates an image of an interior of a subject 200 by utilizing X-rays that have passed through the subject 200. Specifically, the X-ray imaging apparatus 100 is an X-ray phase imaging apparatus that generates the image of the interior of the subject 200 by utilizing a Talbot effect. The X-ray imaging apparatus 100 can be used for imaging an interior of an object, for example, in a non-destructive testing application.

The X-ray imaging apparatus 100 is provided with an X-ray source 1, a first grating 2, a second grating 3, a third grating 4, a detector 5, an image processing unit 6, a control unit 7, a rotating mechanism 8, and a grating moving mechanism 9. Note that in this specification, the direction from the X-ray source 1 to the first grating 2 is defined as a Z2-direction and the opposite direction is defined as a Z1-direction. The left-right direction in a plane orthogonal to the Z-direction is defined as an X-direction, the direction toward the back side of the paper is defined as an X2-direction, and the direction toward the front side of the paper is defined as an X1-direction. The up-down direction in a plane orthogonal to the Z-direction is defined as a Y-direction, the upward direction is defined as a Y1-direction, and the downward direction is defined as a Y2-direction.

The X-ray source 1 is configured to generate X-rays and emit the generated X-rays in the Z2-direction when a high voltage is applied.

The first grating 2 includes a plurality of slits 2a and X-ray phase change portions 2b arranged at a predetermined period (pitch) d1 in the Y-direction. The slit 2a and the X-ray phase change portion 2b are each formed so as to extend linearly. The slit 2a and the X-ray phase change portion 2b are each formed so as to extend in parallel with each other. The first grating 2 is a so-called phase grating.

The first grating 2 is arranged between the X-ray source 1 and the second grating 3, and is irradiated with X-rays from the X-ray source 1. The first grating 2 is provided to form a self-image (not illustrated) of the first grating 2 by a Talbot effect. When coherent X-rays pass through a grating in which slits are formed, an image (self-image) of the grating is formed at a predetermined distance (Talbot distance) from the grating. This is called a Talbot effect.

The second grating 3 includes a plurality of X-ray transmission portions 3a and X-ray absorption portions 3b arranged at a predetermined period (pitch) d2 in the Y-direction. The X-ray absorption portion 3b extends in a direction in which the X-ray phase change portion 2b extends. The X-ray transmission portion 3a and the X-ray absorption portion 3b are each formed so as to extend linearly. Further, the X-ray transmission portion 3a and the X-ray absorption portion 3b are each formed so as to extend in parallel with each other. The second grating 3 is a so-called absorption grating. The first grating 2 and the second grating 3 are gratings with distinct roles, but the slit 2a and the X-ray transmission portion 3a each allow X-rays to pass through. The X-ray absorption portion 3b serves to shield the X-rays, and the X-ray phase change portion 2b changes the phase of the X-rays by the difference in the refractive index between the X-ray phase change portion 2b and the slit 2a.

The second grating 3 is arranged between the first grating 2 and the detector 5, and is irradiated with the X-rays that have passed through the first grating 2. The second grating 3 is arranged at a position away from the first grating 2 by the Talbot distance. The second grating 3 interferes with the self-image of the first grating 2 to form a Moire fringe (not illustrated) on the detection surface of the detector 5.

The third grating 4 includes a plurality of X-ray transmission portions 4a and X-ray absorption portions 4b arranged at a predetermined period (pitch) d3 in the Y-direction. The X-ray transmission portion 4a and the X-ray absorption portion 4b are each formed so as to extend linearly. The X-ray transmission portion 4a and the X-ray absorption portion 4b are each formed so as to extend in parallel with each other. The third grating 4 is a so-called multi-slit.

The third grating 4 is arranged between the X-ray source 1 and the first grating 2. The third grating 4 is configured to convert the X-rays from the X-ray source 1 into a multipoint light source by using the X-rays that have passed through the respective X-ray transmission portions 4a as a line light source. The coherence of the X-rays irradiated from the X-ray source 1 can be enhanced by satisfying a condition in which the pitch of the three pieces of gratings (the first grating 2, the second grating 3, and the third grating 4) and the distance between the gratings are constant. With this, it is possible to retain the interferometric strength even if the focal length of the tube of X-ray source 1 is large.

The detector 5 is configured to detect X-rays, convert the detected X-rays into an electric signal, and read the converted electric signal as an image signal. The detector 5 is, for example, an FPD (Flat Panel Detector). The detector 5 is composed of a plurality of conversion elements (not illustrated) and a plurality of pixel electrodes (not illustrated) arranged on the plurality of conversion elements. The plurality of conversion elements and pixel electrodes are arranged in an array in the X-direction and the Y-direction at a predetermined period (pixel pitch). The detector 5 is configured to output the acquired image signal to the image processing unit 6.

The image processing unit 6 is configured to generate the image of the inside of the subject 200 based on the image signal (detection data) output from the detector 5. Specifically, the image processing unit 6 is configured to generate an absorption image, a phase differential image, and a dark-field image based on the image signal output from the detector 5. Note that the absorption image is an image of the contrast caused by the difference in the X-ray absorption due to the subject 200. The phase differential image is an image of the contrast caused by the change in the phase of the X-rays due to the subject 200. The dark-field image is an image of the contrast caused by the refraction (scattering) of the X-rays due to the microstructures inside the subject 200. In other words, the dark-field image is an image of the reduction in the visibility due to the subject 200, and the reduction in the visibility depends on the degree of scattering of the subject 200. That is, the dark-field image is an image of the X-ray scattering of the subject 200.

The image processing unit 6 acquires three-dimensional volume data (CT-data) by reconstruction processing such as an FBP (Filtered Back Projection) based on the X-ray detection data from the detector 5. Specifically, the image processing unit 6 acquires three-dimensional volume data by reconstruction processing based on a plurality of images (i.e., a plurality of absorption images, a plurality of phase differential images, or a plurality of dark-field images) captured while rotating the rotating mechanism 8 (at each of the plurality of rotational angles). For example, the image processing unit 6 acquires volume data of the absorption image based on a plurality of absorption images. Further, for example, the image processing unit 6 acquires volume data of the phase image based on a plurality of phase differential images. Also, for example, the image processing unit 6 acquires volume data of the dark-field image based on a plurality of dark-field images. The image processing unit 6 includes processors, such as, e.g., a GPU (Graphics Processing Unit) and an FPGA (Field-Programmable Gate Array) configured for image-processing.

The control unit 7 is configured to relatively rotate the subject 200 and an imaging system 300 composed of the X-ray source 1, the detector 5, and a plurality of gratings (the first grating 2, the second grating 3, and the third grating 4) by the rotating mechanism 8. The control unit 7 is configured to move the first grating 2 stepwise in a direction perpendicular to the grating direction in the grating plane by a grating moving mechanism 9. The X-ray imaging apparatus 100 uses a technique (fringe scanning method) of acquiring an image from a plurality of Moire fringes (images) acquired by scanning the first grating 2 at regular periodic intervals. Note that the control unit 7 includes a processor, such as, e.g., a CPU (Central Processing Unit).

The rotating mechanism 8 is configured to relatively rotate the subject 200 and the imaging system 300 based on the signal from the control unit 7. Specifically, the rotating mechanism 8 is configured to relatively rotate the subject 200 with respect to the imaging system 300 by rotating the subject 200 about the axis 400. FIG. 1 shows a state in which the direction (the Y-direction in FIG. 1) in which the axis 400 extends and a grating direction (the X-direction in FIG. 1) in which the plurality of gratings is orthogonal. However, the grating direction of the plurality of gratings extends may be changed to a predetermined direction (e.g., the Y-direction). Note that the grating direction denotes a direction in which the grating pattern of the gratings extends. Also note that the grating pattern denotes the slit 2a, the X-ray phase change portion 2b, the X-ray transmission portion 3a, the X-ray absorption portion 3b, etc., of each grating. Also note that the rotating mechanism 8 includes, for example, a rotating stage 8a driven by a motor or the like.

The grating moving mechanism 9 is configured to move the first grating 2 stepwise in a direction (the Y-direction in FIG. 1) perpendicular to the grating direction in the grating plane (in the X-Y plane) based on the signal from the control unit 7. Specifically, the grating moving mechanism 9 moves the first grating 2 stepwise by d1/n obtained by dividing the period d1 of the first grating 2 by n. The grating moving mechanism 9 is configured to move the first grating 2 stepwise by at least 1 period d1 of the first grating 2. Note that "n" is a positive integer, for example, 9. Further note that the grating moving mechanism 9 includes, for example, a stepping motor or a piezo actuator.

(Configuration of Subject)

Next, referring FIG. 2, the configuration of the subject 200 will be described.

Figure 2:
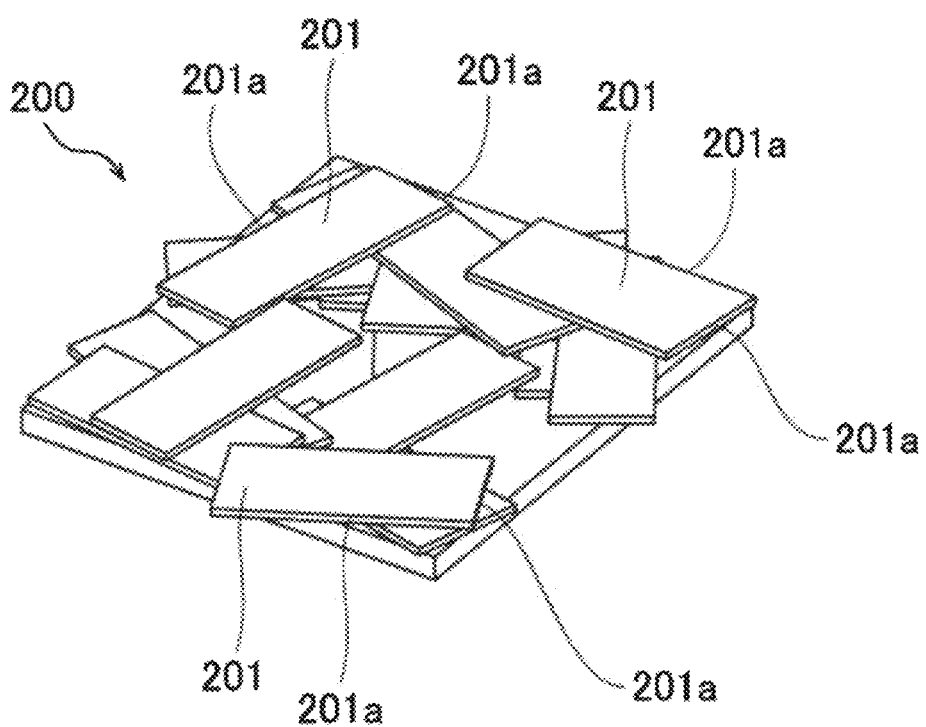
FIG. 2 is a diagram showing a subject imaged by an X-ray imaging apparatus according to an embodiment.

The subject 200 as shown in FIG. 2 is a carbon fiber reinforced plastics (CFRP) which is a composite of carbon fibers and a resin as a base material. The subject 200 has a structure in which a plurality of randomly arranged sheets 201 (tapes) are stacked. The sheet 201 is a fiber bundle in which a large number of carbon fibers is gathered to shape a bundle and has a thin film form. The subject 200 can be formed, for example, by heating and pressurizing (pressing) a plurality of randomly arranged sheets 201. In FIG. 2, for convenience of illustration, only the sheets 201 among the stacked sheets 201 on the surface of the subject 200 is illustrated. However, the sheet 201 is present not only on the surface of the subject 200 but also inside the subject.

In the subject 200 as shown in FIG. 2, it is considered that detecting the edge 201a (sheet end face) of the sheet 201 is essential. This is because, at the edge 201a of the sheet 201, the resin as the base material is segregated, so that the edge 201a of the sheet 201 is expected to be the starting point of breakage. For this reason, the X-ray imaging apparatus 100 of this embodiment performs processing of detecting the edge 201a of the sheet 201 of the subject 200.

Figure 3A:
FIG. 3A is a photograph showing one example of an absorption image of a subject.
Figure 3B:
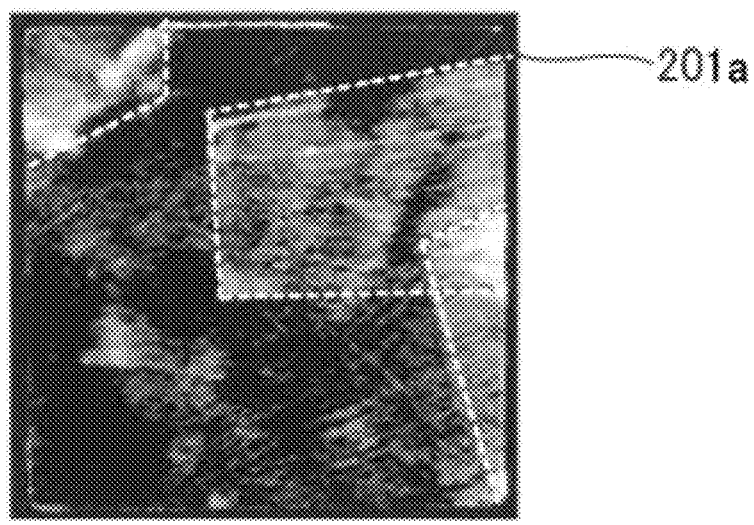
FIG. 3B is a photograph showing one example of a dark-field image of a subject.

FIG. 3A shows an absorption image acquired by imaging the subject 200 as shown in FIG. 2, and FIG. 3B shows a dark-field image acquired by imaging the subject 200 as shown in FIG. 2. As shown in FIG. 3A and FIG. 3B, in the dark-field image (see FIG. 3B), the edge 201a of the sheet 201 is clearly reflected, as compared with the absorption image (see FIG. 3A). Since the X-ray scattering of the subject 200 has an orientation, the scattering components in a direction (the Y-direction in FIG. 1) perpendicular to the grating are detected. That is, in the dark-field image, the sheet 201 having a fiber direction corresponding to the grating direction (the direction in which the grating pattern of the grating extends) of the grating is reflected clearly. On the other hand, the sheet 201 having a fiber direction corresponding to the direction perpendicular to the direction of the grating direction is not reflected clearly. Therefore, in the dark-field image, the edge 201a of the sheet 201 is reflected clearly as compared with the absorption image.

For the above-described reason, it is preferable to perform the processing of detecting the edge 201a of the sheet 201 of the subject 200 by using the dark-field image. Note that in the case of performing the processing of detecting the edge 201a of the sheet 201 of the subject 200 using the dark-field image, the edge 201a of the sheet 201 having each fiber direction can be detected by imaging the subject 200 while changing the direction of the subject 200 with respect to the grating pattern of the grating (that is, while rotating the subject 200 about the axis extending in the Z-direction).

(Processing Relating to Edge Detection of Subject)

Here, in this embodiment, as shown in FIG. 4A to FIG. 4C and FIG. 5, the image processing unit 6 is configured to acquire a plurality of pieces of slice image data 502 from the volume data 501 of the dark-field image, acquire a plurality of pieces of the first processed image data 503 respectively corresponding to the plurality of pieces of the slice image data 502 by subjecting each of the acquired plurality of the slice image data 502 to differential processing as first processing, acquire a plurality of pieces of second processed image data 504 by subjecting the acquired plurality of the first processed image data 503 to second processing including addition processing, detect the edges 201a of the subject 200 based on the plurality of pieces of the acquired second processed image data 504, and acquire the edge image data 506 including the detected edges 201a of the subject 200. Note that in FIG. 4A to FIG. 4C, an example in which the subject 200 has only one sheet 201 is shown for easier understanding.

<Differential Processing>

Figure 4A:
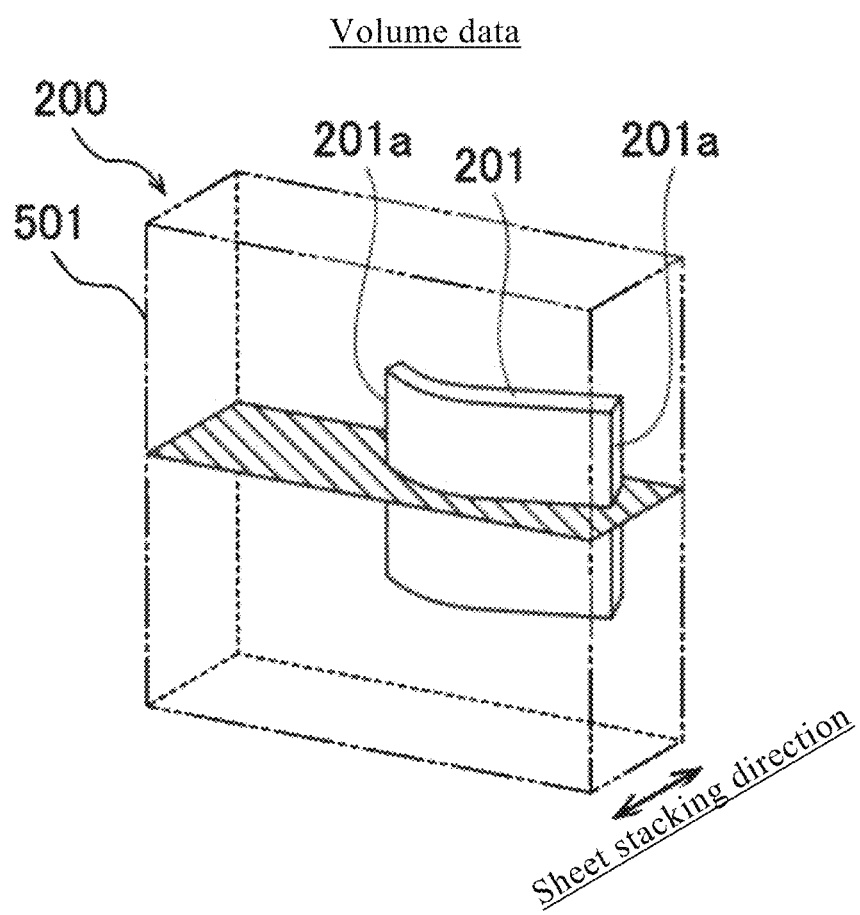
FIG. 4A is a diagram for explaining volume data and slice image data according to an embodiment.
Figure 4B:
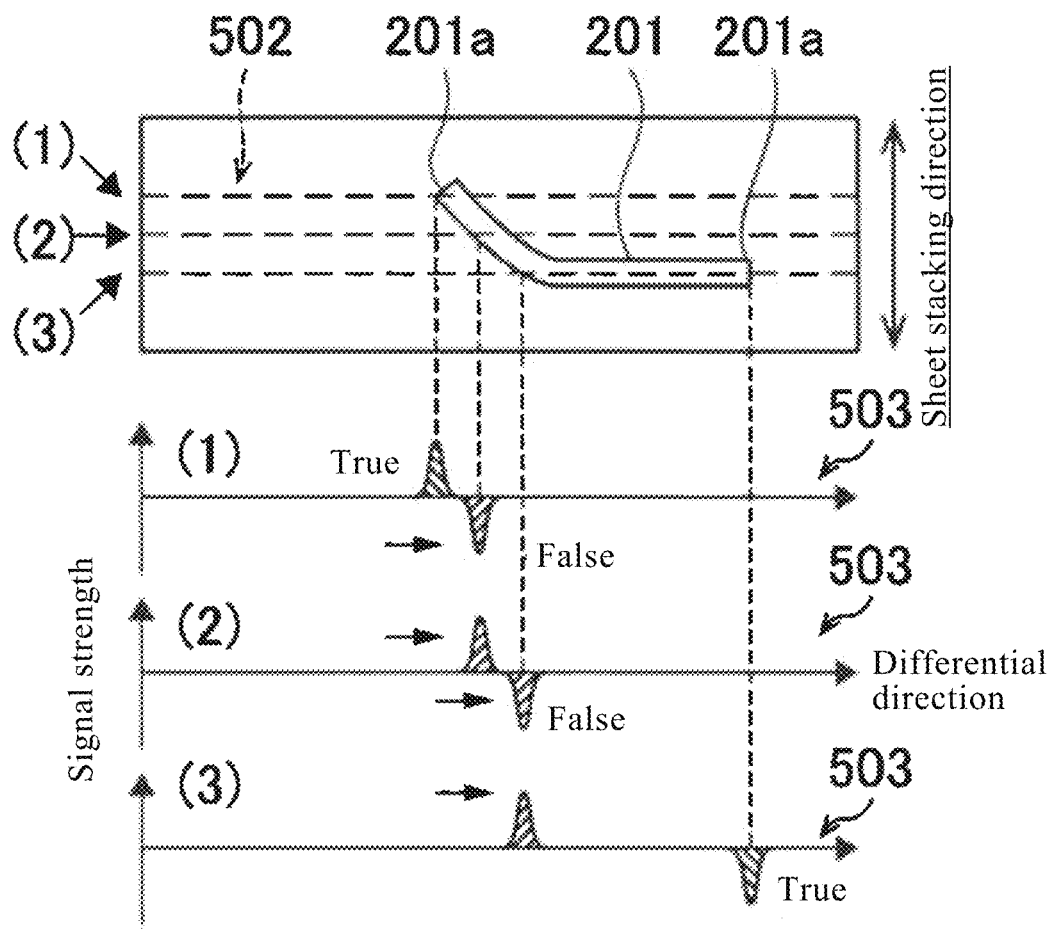
FIG. 4B is a diagram for explaining differential processing according to an embodiment.
Figure 5:
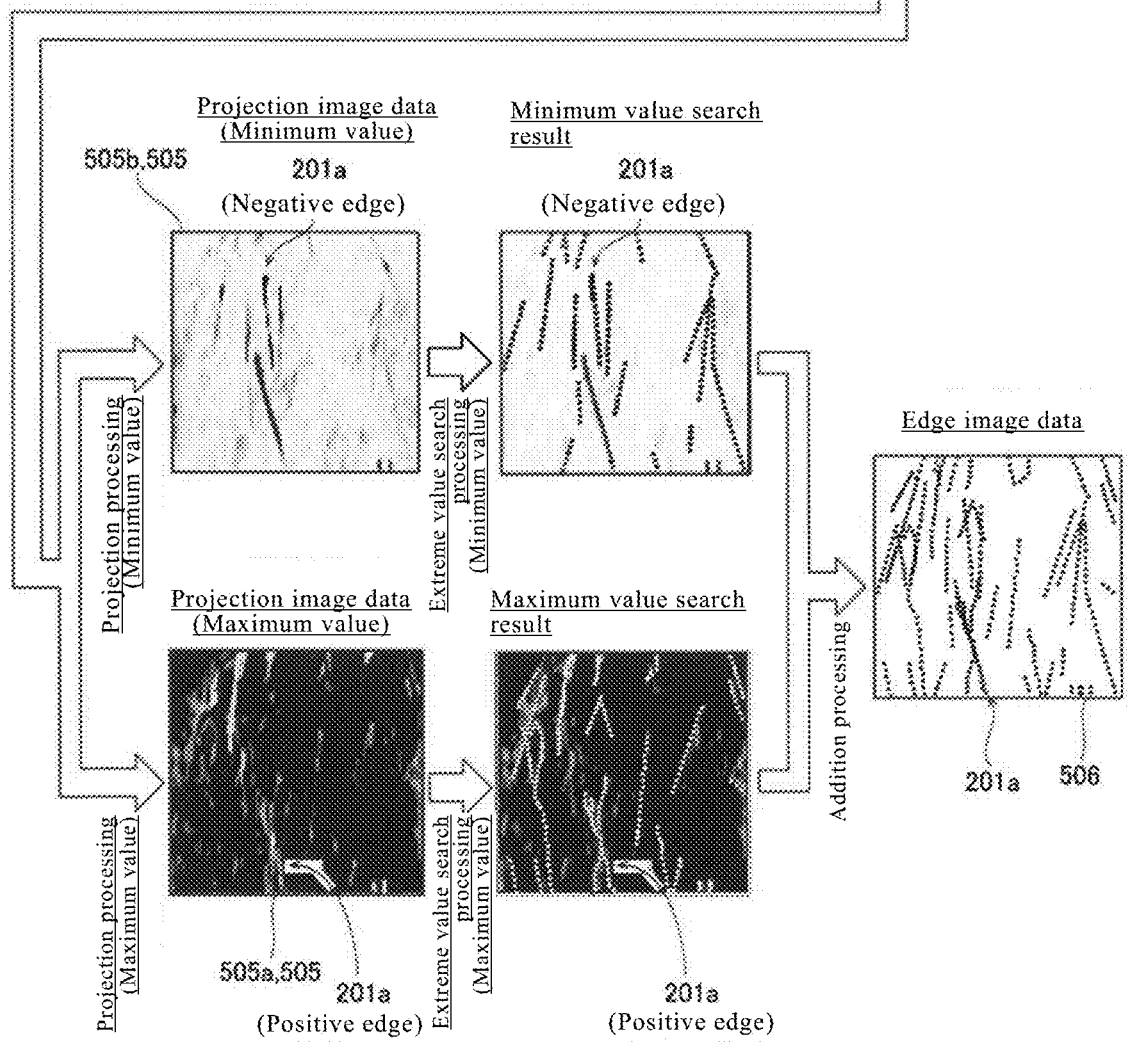
FIG. 5 is a diagram for explaining the acquisition of edge image data from an X-ray imaging apparatus according to an embodiment.

As shown in FIG. 4A, FIG. 4B, and FIG. 5, first, the image processing unit 6 acquires a plurality of pieces of slice image data 502 based on the volume data 501. Each of the plurality of pieces of slice image data 502 is slice image data (tomographic image data) along a direction perpendicular to the stacking direction of the sheet 201.

Then, the image processing unit 6 subjects each of the acquired plurality of pieces of slice image data 502 to differential processing (differential filtering processing) as first processing. With this, the image processing unit 6 acquires the same number of pieces of the first processed image data 503 (differential image data) as the plurality of pieces of the slice image data 502. At this time, the differentiation direction of the differential processing may be arbitrarily determined. In a case where there is an edge 201a to be detected, the direction perpendicular to the edge 201a to be detected may be set to the differential direction.

In FIG. 4B, an example is shown in which three pieces (1) to (3) of the first processed image data 503 are acquired by subjecting three pieces (1) to (3) of the slice image data 502 to differential processing. In practice, however, more pieces of the slice image data 502 are subjected to differential processing. That is, every piece of the slice image data 502 ranging from one end (first end) to the other end (second end) in the stacking direction of the sheet 201 is subjected to the differential processing.

The first processed image data 503 includes a signal representing a true edge due to the edge 201a of the sheet 201 and a signal representing a false edge due to the three-dimensional structure of the sheet 201. The differential processing is the processing of extracting a portion (signal) corresponding to an edge 201a from the slice image data 502.

As shown in FIG. 4B, in the adjacent first processed image data 503, a signal representing a false edge with inverted polarity appears at the same position. For example, a false edge appeared as a negative signal in the first processed image data 503 shown (1) in FIG. 4B appears as a positive signal at the same position in the first processed image data 503 shown in (2) of FIG. 4B. Similarly, the false edge appeared as a negative signal in the first processed image data 503 shown in (2) of FIG. 4B appears as a positive signal at the same position in the first processed image data 503 shown in (3) of FIG. 4B.

<Averaging Processing>

Figure 4C:
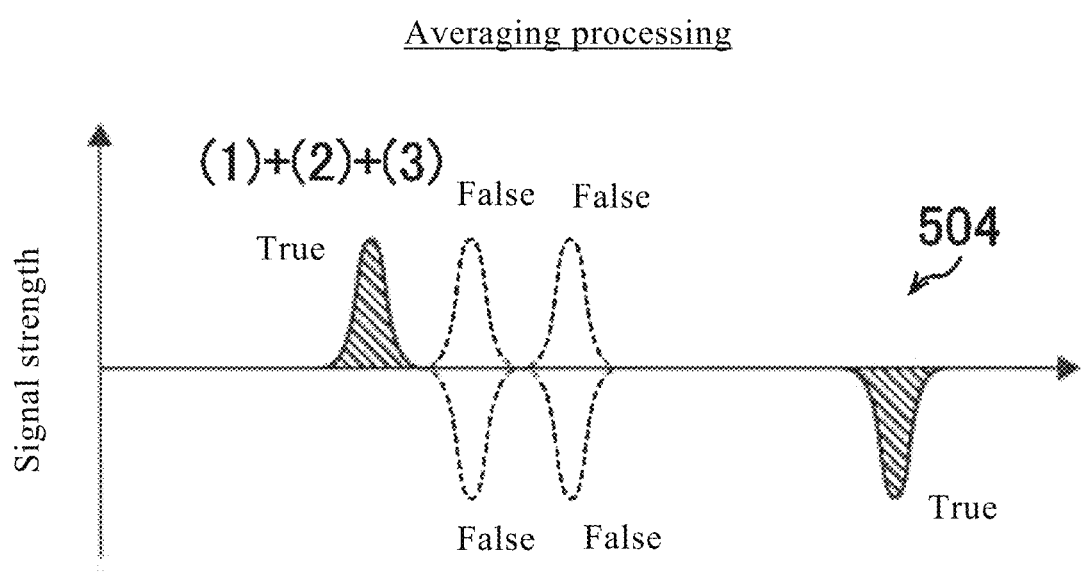
FIG. 4C is a diagram for explaining averaging processing according to an embodiment.

Then, as shown in FIG. 4C and FIG. 5, the image processing unit 6 acquires a plurality of pieces of second processed image data 504 (averaged image data) by subjecting the plurality of pieces of first processed image data 503 to averaging processing as second processing including addition processing. With this, the image processing unit 6 acquires second processed image data 504 in which the signals representing false edges are canceled, while the signals representing the true edges are remained without being canceled. That is, the second processing including addition processing is the processing of canceling the signals representing the false edges.

At this time, the image processing unit 6 subjects the number of pieces of the first processed image data 503 corresponding to the three-dimensional structure of the sheet 201 among a plurality of pieces of the first processed image data 503 to averaging processing as second processing. The number corresponding to the three-dimensional structure of the sheet 201 is, for example, the number corresponding to a range in which one piece of the sheet 201 can exist in the stacking direction of the sheets 201. The number corresponding to the three-dimensional structure of the sheet 201 can be determined in advance by a test or the like, considering the thickness of the sheet 201 and the deformation (e.g., bending) of the sheet 201.

The image processing unit 6 acquires a single piece of the second processed image data 504 by subjecting some pieces of the first processed image data 503 corresponding to the three-dimensional structure of the sheet 201 among the plurality of pieces of the first processed image data 503 to averaging processing as second processing. That is, the image processing unit 6 acquires a plurality of pieces of the second processed image data 504 by subjecting each portion of the plurality of pieces of the first processed image data 503 corresponding to the three-dimensional structure of the sheet 201 to averaging processing as second processing.

<Projection Processing>

Then, as shown in FIG. 5, the image processing unit 6 acquires third processed image data 505 (projection image data) by performing projection processing as third processing on all of the plurality of pieces of the second processed image data 504. Then, the image processing unit 6 detects edges 201a of the sheet 201 of the subject 200 based on the acquired third processed image data 505, and acquires edge image data 506 including the detected edges 201a of the sheet 201 of the subject 200.

Specifically, the image processing unit 6 is configured to acquire, as the third processed image data 505, positive side third processed image data 505a in which the positive edges 201a (see FIG. 4B) which is the edges 201a of the sheet 201 of the subject 200 represented by the positive signals at the time of the differential processing are aggregated into one and negative side third processed image data 505b in which negative edges 201a (see FIG. 4B) which are edges 201a of the sheet 201 of the subject 200 represented by the negative signals at the time of the differential processing are aggregated into one. That is, the projection processing as the third processing is the processing of extracting and aggregating the signals corresponding to the edges 201a included in each of the plurality of pieces of the second processed image data 504.

The positive side third processed image data 505a can be acquired, for example, by subjecting a plurality of pieces of the second processed image data 504 to projection processing in which the maximum value is selected as a projection parameter. By performing the projection processing in which the maximum value is selected as the projection parameter, a signal portion of the maximum value (that is, the portion corresponding to the positive edge 201a) can be extracted from the plurality of second processed image data 504. Note that if the edges 201a of the sheet 201 of the subject 200 represented by the positive signals can be extracted, it is not necessarily required to select the maximum value as the projection parameter.

Further, the negative side third processed image data 505b can be acquired by, for example, subjecting a plurality of pieces of the second processed image data 504 to projection processing in which the minimum value is selected as a projection parameter. By performing projection processing in which the minimum value is selected as a projection parameter, it is possible to extract a signal portion of the minimum value (i.e., a portion corresponding to the negative edge 201a) from the plurality of pieces of the second processed image data 504. Note that if the edge 201a of the sheet 201 of the subject 200 represented by the negative signals can be extracted, the minimum value does not necessarily have to be selected as the projection parameter.

<Extreme Value Search Processing, Edge Image Data>

The image processing unit 6 detects the edges 201a of the sheet 201 of the subject 200 by subjecting the third processed image data 505 to maximum value search processing (mountain climbing method, etc.) as fourth processing and acquires edge image data 506 including the detected edges 201a of the sheet 201 of the subject 200.

Specifically, the image processing unit 6 detects a positive edge 201a from the positive side third processed image data 505a by subjecting the positive side third processed image data 505a to maximum value search processing, detects a negative edge 201a from the negative side third processed image data 505b by subjecting the negative side third processed image data 505b to minimum value search processing, and acquires edge image data 506 including the detected positive edge 201a and the detected negative edge 201a. The edge image data 506 contains edges 201a inside the subject 200.

In the example shown in FIG. 5, the entirety of the plurality of pieces of the second processed image data 504 is subjected to projection processing as third processing, but this embodiment is not limited to this. That is, in this embodiment, the plurality of the second processed image data 504 may be divided into several portions in the stacking direction of the sheets 201, and each of the divided portions may be subjected to projection processing as third processing. For example, each piece of the second processed image data 504a may be subjected to projection processing as third processing, each part of a plurality of pieces of second processed image data 504 adjacent to each other as one part may be subjected to projection processing as third processing. With this, a plurality of pieces of edge image data 506 including edges 201a at mutually different positions in the stacking direction of the sheets 201 can be acquired.

Effects of Embodiment

In this embodiment, the following effects can be obtained.

In this embodiment, as described above, a plurality of pieces of the slice image data 502 is acquired from volume data 501, and a plurality of pieces of the first processed image data 503 respectively corresponding to the plurality of pieces of the slice image data 502 is acquired by subjecting each of the plurality of pieces of the acquired slice image data 502 to differential processing as first processing. With this, the first processed image data 503 including a signal representing a true edge 201a and a signal representing a false edge 201a can be acquired. Then, a plurality of pieces of the second processed image data 504 is acquired by subjecting a plurality of the first processed image data 503 to second processing including addition processing. With this, the second processed image data 504 in which the signal representing the true edge 201a remains without being canceled and the signal representing false edge 201a is canceled can be acquired. Then, the edges 201a of the subject 200 are detected based on the plurality of pieces of the second processed image data 504, and the edge image data 506 including the detected edges 201a of the subject 200 is acquired. With this, the edges 201a of the subject 200 can be detected with high accuracy, and the edge image data 506 including the edges 201a of the subject 200 detected with high accuracy can be acquired. As a result, in the case of detecting the edges 201a of the subject 200 from the three-dimensional volume data 501, the edge analysis of the subject 200 can be performed with high accuracy based on the edge image data 506 including the edges 201a of the subject 200 detected with high accuracy.

Further, in this embodiment, as described above, the image processing unit 6 is configured to acquire a plurality of pieces of the second processed image data 504 by subjecting a plurality of the first processed image data 503 to averaging processing as second processing including addition processing. With this, unlike the case in which a plurality of the first processed image data 503 is simply subjected to addition processing, since it is possible to average the added plurality of the first processed image data 503, it is possible to suppress the signal value of the second processed image data 504 acquired from the plurality of pieces of the first processed image data 503 from becoming excessively large.

Further, in this embodiment, as described above, the image processing unit 6 is configured to acquire one piece of the second processed image data 504 by subjecting a portion of the first processed image data 503 among a plurality of pieces of the first processed image data 503 to averaging processing as second processing. With this, as compared with the case in which one piece of the second processed image data 504 is acquired by subjecting all of the plurality of pieces of the first processed image data 503 to averaging processing as second processing, it becomes possible to suppress excessive flattening of the signal value of the signal representing the true edge 201a by the averaging processing. As a result, as compared with the case in which the signal value of the signal representing the true edge 201a is excessively flattened, the edge 201a of the subject 200 can be detected more accurately.

Further, in this embodiment, as described above, the subject 200 is configured to have a configuration in which a plurality of randomly arranged sheets 201 is stacked. Further, the image processing unit 6 is configured to detect the edges 201a of the sheet 201 of the subject 200 and acquire the edge image data 506 including the detected edges 201a of the sheet 201 of the subject 200. With this, in a subject 200 including a plurality of sheets 201, in the case of analyzing the edges 201a of the sheet 201 of the subject 200, the edge analysis of the sheet 201 of the subject 200 can be performed with high accuracy based on the edge image data 506 including the edges 201a of the sheet 201 of the subject 200 detected with high accuracy.

Further, in this embodiment, as described above, the image processing unit 6 is configured to acquire the third processed image data 505 by subjecting a plurality of the second processed image data 504 to projection processing as third processing, detect the edges 201a of the subject 200 of the sheet 201 based on the acquired third processed image data 505, and acquire the edge image data 506 including the detected edges 201a of the sheet 201 of the subject 200. With this, the edges 201a of the sheet 201 of the subject 200 can be detected in a state in which the edges 201a of the sheet 201 of the subject 200 included in the plurality of pieces of the second processed image data 504 in a dispersed manner are aggregated in the third processed image data 505, so the edges 201a of the sheet 201 of the subject 200 can be easily detected. Further, since the edge image data 506 in which the edges 201a are aggregated can be easily acquired, the edge analysis of the sheet 201 of the subject 200 can be easily performed.

Further, in this embodiment, as described above, the image processing unit 6 is configured to acquire, as third processed image data 505, a positive side third processed image data 505a in which the positive edge 201a which is the edge 201a of the sheet 201 of the subject 200 represented by a positive signal at the time of differential processing is aggregated into one, and a negative side third processed image data 505b in which the negative edge 201a which is an edge 201a of the sheet 201 of the subject 200 represented by a negative signal at the time of differential processing is aggregated into one. With this, the positive edge 201a and the negative edge 201a can be detected in a separated state, so that the edges 201a can be easily and reliably detected as compared with the case in which the positive edge 201a and the negative edge 201a are detected in a mixed state.

Further, in this embodiment, as described above, the image processing unit 6 is configured to detect the positive edge 201a from the positive side third processed image data 505a by subjecting the positive side third processed image data 505a to maximum value search processing, detect the negative edge 201a from the negative side third processed image data 505b by subjecting the negative side third processed image data 505b to minimum value search processing, and acquire the edge image data 506 including the detected positive edge 201a and the detected negative edge 201a. With this, the edge image data 506 including the positive edge 201a accurately detected from the positive side third processed image data 505a by the maximum value search processing and the negative edge 201a accurately detected from the negative side third processed image data 505b by the minimum value search processing can be acquired, so that the edge analysis of the sheet 201 of the subject 200 can be accurately performed.

Further, in this embodiment, as described above, the X-ray imaging apparatus 100 is configured to include the first grating 2 arranged between the X-ray source 1 and the detector 5 and configured to be irradiated with the X-rays from the X-ray source 1, and the second grating 3 arranged between the first grating 2 and the detector 5 and configured to be irradiated with the X-rays passed through the first grating 2. With this, the edges 201a of the subject 200 can be detected with high accuracy in the X-ray imaging apparatus 100 which is an X-ray phase imaging apparatus, and the edge image data 506 including the edges 201a of the subject 200 detected with high accuracy can be acquired.

Further, in this embodiment, as described above, the image processing unit 6 is configured to acquire the edge image data 506 based on the volume data 501 of a dark-field image. With this, the edge image data 506 can be acquired based on the volume data 501 of the dark-field image in which the edges 201a of the subject 200 are clearly reflected, so that the edge image data 506 including the edges 201a of the subject 200 detected with high accuracy can be easily acquired.

Modified Embodiment

It should be noted that the embodiment disclosed herein is to be considered in all respects as illustrative and not restrictive. The scope of the present invention is shown in the claims rather than by the aforementioned embodiments, and the scope of the present invention includes all modifications (modified examples) within the meanings and ranges equivalent to the claims.

For example, in the aforementioned embodiment, the present invention shows an example in which the present invention is applied to an X-ray phase imaging apparatus, but the present invention is not limited thereto. The present invention may be applied to an X-ray imaging apparatus other than an X-ray phase imaging apparatus (for example, an ordinary X-ray imaging apparatus capable of imaging only an absorption image).

In the aforementioned embodiment, an example is shown in which the X-ray imaging apparatus is configured to perform the differential processing as first processing, the second processing including addition processing, the projection processing as third processing, and the extreme value search processing as fourth processing to acquire edge image data, but the present invention is not limited thereto. In the present invention, as long as the X-ray imaging apparatus is configured to perform the differential processing as first processing and the second processing including addition processing, it does not necessarily have to be configured to perform the projection processing as third processing and the extreme value search processing as fourth processing.

In the above-described embodiment, an example is shown in which the second processing including addition processing is averaging processing, but the present invention is not limited to this. In the present invention, the second processing may be addition processing.

In the above-described embodiment, an example is shown in which a portion of the first processed image data among the plurality of piece of the first processed image data is subjected to averaging processing as second processing, but the present invention is not limited to this. In the present invention, all pieces of the plurality of the first processed image data may be subjected to the averaging processing as second processing.

In the above-described embodiment, an example is shown in which the subject has a structure in which a plurality of randomly arranged sheet layers are stacked, but the present invention is not limited to this. In the present invention, the subject does not necessarily have to have a structure in which a plurality of randomly arranged sheets is stacked. Note that the present invention is suitable for a subject having an edge structure inside thereof.

In the above-described embodiment, an example is shown in which the edge image data is acquired based on the volume data of a dark-field image, but the present invention is not limited to this. The edge image data may be acquired based on volume data of an absorption image or volume data of a phase image.

In the above-described embodiment, an example is shown in which the subject is rotated by the rotating mechanism to perform imaging for acquiring the volume data, but the present invention is not limited to this. In the present invention, imaging for acquiring the volume data may be performed by rotating an imaging system.

In the aforementioned embodiment, an example is shown in which the third grating is provided, but the present invention is not limited to this. In the present invention, the third grating may not be necessarily provided.

In the aforementioned embodiment, an example is shown in which the first grating is a phase grating, but the present invention is not limited to this. In this embodiment, the first grating may be an absorption grating.

In the aforementioned embodiment, an example is shown in which the first grating is moved stepwise in the grating plane, but the present invention is not limited to this. Any grating among the plurality of gratings may be moved stepwise.

In the aforementioned embodiment, an example is shown in which a carbon-fiber-reinforced plastics (CFRP) is imaged as a subject, but the present invention is not limited to this. In this embodiment, as a subject, a glass-fiber reinforced plastics (GFRP) or the like may be imaged.

Embodiments

It will be understood by those skilled in the art that the above-described exemplary embodiments are concrete examples of the following aspects.

(Item 1)

An X-ray imaging apparatus comprising:
an X-ray source;
a detector configured to detect X-rays emitted from the X-ray source and passed through a subject; and
an image processing unit configured to acquire three-dimensional volume data by reconstruction processing based on X-ray detection data from the detector,
wherein the image processing unit is configured to acquire a plurality of pieces of slice image data from the volume data, acquire a plurality of pieces of first processed image data respectively corresponding to the plurality pieces of the slice image data by respectively subjecting the acquired plurality of pieces of the slice image data to differential processing as first processing, acquire a plurality of pieces of second processed image data by subjecting the acquired plurality of pieces of the first processed image data to second processing including addition processing, detect an edge of the subject based on the acquired plurality of pieces of the second processed image data, and acquire edge image data including the detected edge of the subject.

(Item 2)

The X-ray imaging apparatus as recited in the aforementioned Item 1,
wherein the image processing unit is configured to acquire the plurality of pieces of the second processed image data by subjecting the plurality of pieces of the first processed image data to averaging processing as the second processing including addition processing.

(Item 3)

The X-ray imaging apparatus as recited in the aforementioned Item 2,
wherein the image processing unit is configured to acquire one piece of the second processed image data by subjecting some pieces of the first processed image data to averaging processing as the second processing.

(Item 4)

The X-ray imaging apparatus as recited in any one of the aforementioned Items 1 to 3,
wherein the subject has a structure in which a plurality of randomly arranged sheets is stacked, and
wherein the image processing unit is configured to detect edges of the sheets of the subject and acquire the edge image data including the detected edges of the sheets of the subject.

(Item 5)

The X-ray imaging apparatus as recited in the aforementioned Item 4,
wherein the image processing unit is configured to acquire third processed image data by further subjecting the plurality of pieces of the second processed image data to projection processing as third processing, detect the edges of the sheets of the subject based on the acquired third processed image data, and acquire the edge image data including the detected edges of the sheets of the subject.

(Item 6)

The X-ray imaging apparatus as recited in the aforementioned Item 5,
wherein the image processing unit is configured to acquire, as the third processed image data, positive side third processed image data in which positive edges which are edges of the sheets of the subject represented by positive signals at the time of differential processing are aggregated into one and negative side third processed image data in which negative edges which are edges of the sheets of the subject represented by negative signals at the time of differential processing are aggregated into one.

(Item 7)

The X-ray imaging apparatus as recited in the aforementioned Item 6,
wherein the image processing unit is configured to detect the positive edge from the positive side third processed image data by subjecting the positive side third processed image data to maximum value search processing, detect the negative edge from the negative side third processed image data by subjecting the negative side third processed image data to minimum value search processing, and acquire the edge image data including the detected positive edge and the detected negative edge.

(Item 8)

The X-ray imaging apparatus as recited in any one of the aforementioned Items 1 to 7, further comprising:
a first grating arranged between the X-ray source and the detector and configured to be irradiated with X-rays from the X-ray source; and
a second grating arranged between the first grating and the detector and configured to be irradiated with X-rays passed through the first grating.

(Item 9)

The X-ray imaging apparatus as recited in the aforementioned Item 8,
wherein the image processing unit is configured to acquire the edge image data based on the volume data of a dark-field image.

(Item 10)

The X-ray imaging method comprising:
a step of detecting X-rays that have passed through a subject;
a step of acquiring three-dimensional volume data by reconstruction processing based on detection data of the X-ray;
a step of acquiring a plurality of pieces of slice image data from the volume data;
a step of acquiring a plurality of pieces of first processed image data respectively corresponding to the plurality of pieces of the slice image data by respectively subjecting the plurality of pieces of the slice image data to differential processing as first processing;
a step of acquiring a plurality of pieces of the second processed image data by subjecting the plurality of pieces of the first processed image data to second processing including addition processing; and
a step of acquiring edge image data including a detected edge of the subject by detecting an edge of the subject based on the plurality of pieces of the second processed image data.

The invention claimed is:

1. An X-ray imaging apparatus comprising:
an X-ray source;
a detector configured to detect X-rays emitted from the X-ray source and passed through a subject; and
an image processing unit configured to acquire three-dimensional volume data by reconstruction processing based on X-ray detection data from the detector,
wherein the image processing unit is configured to
acquire a plurality of pieces of slice image data from the volume data, acquire a plurality of pieces of first processed image data respectively corresponding to the plurality pieces of the slice image data by respectively subjecting the acquired plurality of pieces of the slice image data to differential processing as first processing, acquire a plurality of pieces of second processed image data by subjecting the acquired plurality of pieces of the first processed image data to second processing including addition processing, detect an edge of the subject based on the acquired plurality of pieces of the second processed image data, and acquire edge image data including the detected edge of the subject.

2. The X-ray imaging apparatus as recited in claim 1, wherein the image processing unit is configured to acquire the plurality of pieces of the second processed image data by subjecting the plurality of pieces of first processed image data to averaging processing as the second processing including addition processing.

3. The X-ray imaging apparatus as recited in claim 2, wherein the image processing unit is configured to acquire one piece of the second processed image data by subjecting some pieces of the first processed image data to averaging processing as the second processing.

4. The X-ray imaging apparatus as recited in claim 1, wherein the subject has a structure in which a plurality of randomly arranged sheets is stacked, and wherein the image processing unit is configured to detect edges of the sheets of the subject and acquire the edge image data including the detected edges of the sheets of the subject.

5. The X-ray imaging apparatus as recited in claim 4, wherein the image processing unit is configured to acquire third processed image data by further subjecting the plurality of pieces of the second processed image data to projection processing as third processing, detect the edges of the sheets of the subject based on the acquired third processed image data, and acquire the edge image data including the detected edges of the sheets of the subject.

6. The X-ray imaging apparatus as recited in claim 5, wherein the image processing unit is configured to acquire, as the third processed image data, positive side third processed image data in which positive edges which are edges of the sheets of the subject represented by positive signals at the time of differential processing are aggregated into one and negative side third processed image data in which negative edges which are edges of the sheets of the subject represented by negative signals at the time of differential processing are aggregated into one.

7. The X-ray imaging apparatus as recited in claim 6, wherein the image processing unit is configured to detect the positive edge from the positive side third processed image data by subjecting the positive side third processed image data to maximum value search processing, detect the negative edge from the negative side third processed image data by subjecting the negative side third processed image data to minimum value search processing, and acquire the edge image data including the detected positive edge and the detected negative edge.

8. The X-ray imaging apparatus as recited in claim 1, further comprising:

a first grating arranged between the X-ray source and the detector and configured to be irradiated with X-rays from the X-ray source; and a second grating arranged between the first grating and the detector and configured to be irradiated with X-rays passed through the first grating.

9. The X-ray imaging apparatus as recited in claim 8, wherein the image processing unit is configured to acquire the edge image data based on the volume data of a dark-field image.

10. An X-ray imaging method comprising:

a step of detecting X-rays that have passed through a subject;

a step of acquiring three-dimensional volume data by reconstruction processing based on detection data of the X-ray;

a step of acquiring a plurality of pieces of slice image data from the volume data;

a step of acquiring a plurality of pieces of first processed image data respectively corresponding to the plurality of pieces of the slice image data by respectively subjecting the plurality of pieces of the slice image data to differential processing as first processing;

a step of acquiring a plurality of pieces of second processed image data by subjecting the plurality of pieces of the first processed image data to second processing including addition processing; and a step of acquiring edge image data including a detected edge of the subject by detecting an edge of the subject based on the plurality of pieces of the second processed image data.

* * * * *